April 25, 1944.  G. H. STAHLER  2,347,374
MACHINE FOR WORKING WOOD AND OTHER MATERIALS
Filed June 18, 1942  3 Sheets-Sheet 1

INVENTOR.
BY GEORGE H. STAHLER
Adrian Medert
ATTORNEY

April 25, 1944. G. H. STAHLER 2,347,374
MACHINE FOR WORKING WOOD AND OTHER MATERIALS
Filed June 18, 1942 3 Sheets-Sheet 2
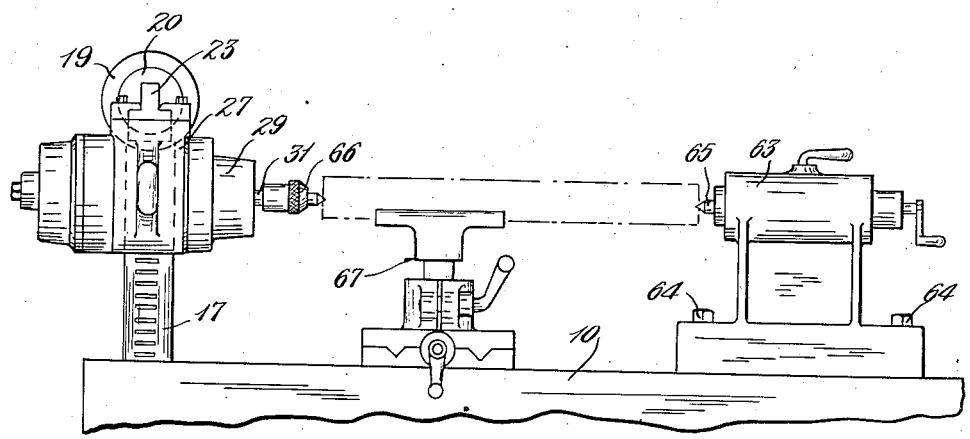
Fig. 4
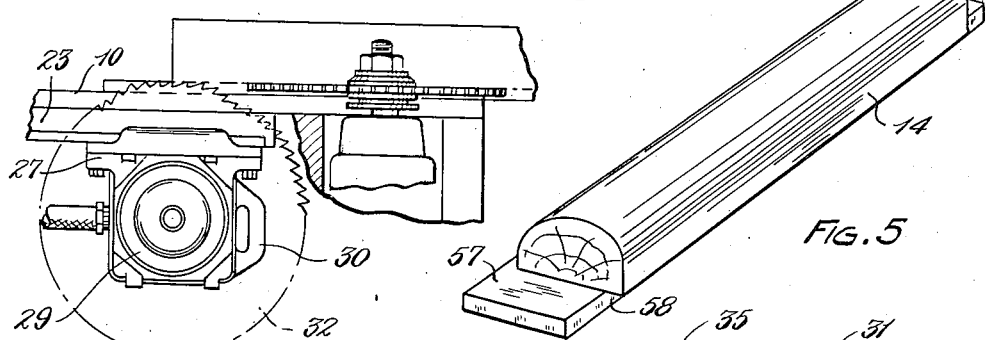
Fig. 3
Fig. 5
Fig. 7
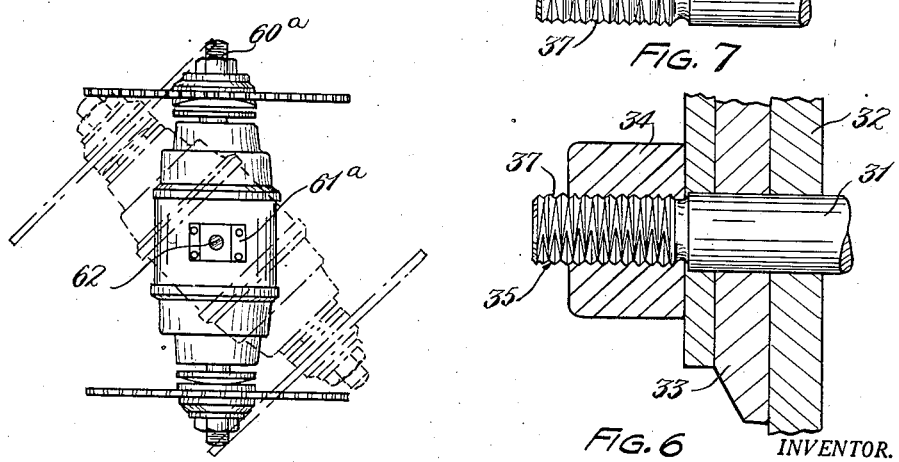
Fig. 8
Fig. 6
INVENTOR.
BY GEORGE H. STAHLER
ATTORNEY April 25, 1944. G. H. STAHLER 2,347,374
MACHINE FOR WORKING WOOD AND OTHER MATERIALS
Filed June 18, 1942 3 Sheets-Sheet 3

INVENTOR.
GEORGE H. STAHLER
BY
Adrian Medert
ATTORNEY

Patented Apr. 25, 1944

2,347,374

UNITED STATES PATENT OFFICE 2,347,374

MACHINE FOR WORKING WOOD AND OTHER MATERIALS

George H. Stahler, Shaker Heights, Ohio

Application June 18, 1942, Serial No. 447,493

2 Claims. (Cl. 143—35)

This invention relates to new and useful improvements in machines for working wood and other materials, and more particularly to a sawing machine capable of being converted to adapt it for a plurality of different operations.

It is among the objects of the present invention to provide a sawing machine having a supporting table and a slidable cutter carriage mounted upon a supporting arm, arranged for positioning above or below the surface of the table to operate on work disposed on the surface of the table either from above or below.

It is a further object of the invention to provide a sawing machine which can be readily converted to perform a plurality of different operations such as drilling, shaping, lathe turning and the like.

A still further object of the invention is to provide a sawing machine with a saw blade disposed in position in one plane, and a second saw arranged to be adjusted to any angulated position relative to the cutting edge of the first saw.

Another object of the invention is to provide a sawing machine having improved adjusting and saw carriage supporting means affording a large range of adjustments, and which facilitates the adjustment of the machine for various types of work.

These and other objects of the invention will become more apparent from the following detailed description of the invention taken in conjunction with the accompanying drawings, wherein similar reference characters denote corresponding parts and wherein, Figure 1 is a fragmentary top plan view of a machine constructed in accordance with this invention, Figure 2 is a fragmentary side elevational view, partly in section, of the device illustrated in Figure 1, Figure 3 is a fragmentary sectional view of the relative position of the saws when disposed in under cutting position with respect to work disposed on the table top.

Figure 4 illustrates the apparatus of Figure 1 converted for lathe turning by the addition of a tail stock and tool support, suitably mounted on the surface of the work supporting table.

Figure 5 is a perspective view of a log cut on the device of this invention,

Figure 9:
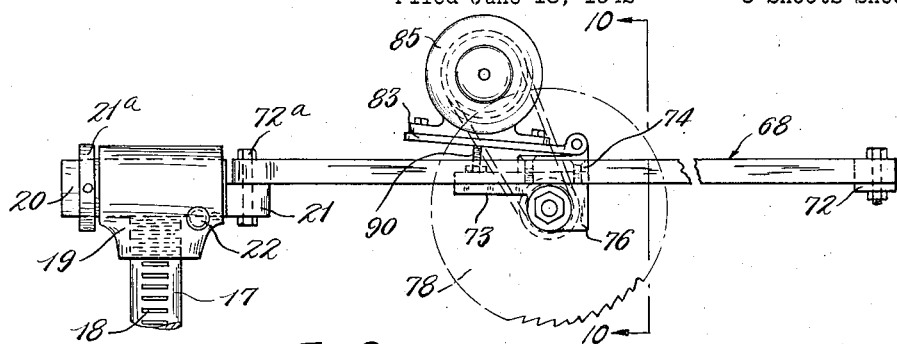
Figure 10:
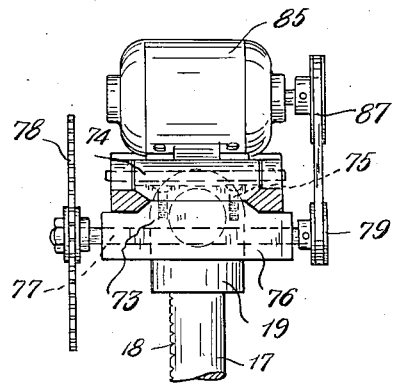
Figure 12:
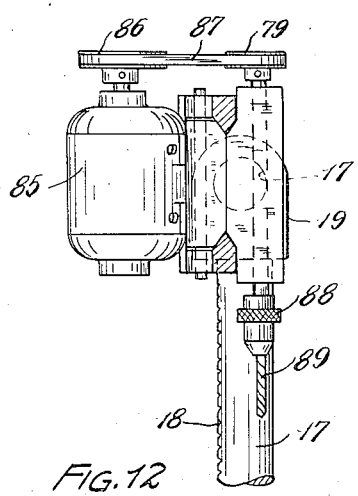
Figure 11:
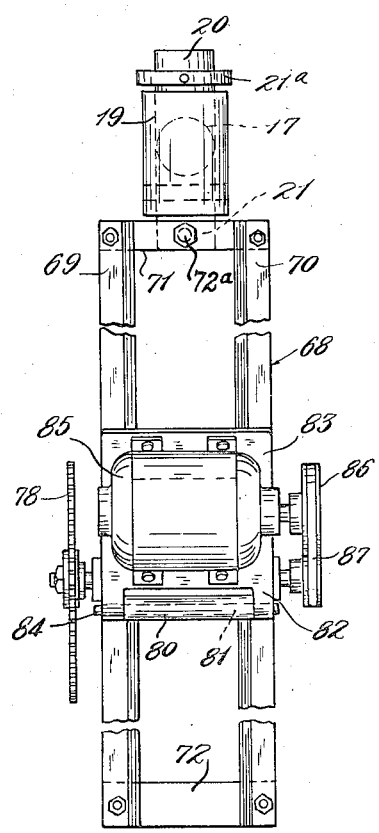

Figure 6 is a fragmentary sectional view illustrating a double cut threaded shaft and nut therefor, Figure 7 is a side elevational view of the threaded end of the shaft without the nut, Figure 8 is a side elevational view of a reversible motor having saw blades disposed on the ends of the shaft, the dotted lines showing the pivoting positions, Figure 9 is a side elevational view of a modified form of tool supporting arm, Figures 10 and 11 are end elevational and top plan views, respectively, of the structure shown in Figure 9, Figure 12 is an end view illustrating the tool head rotated into position for use as a drill.

Figure 1:
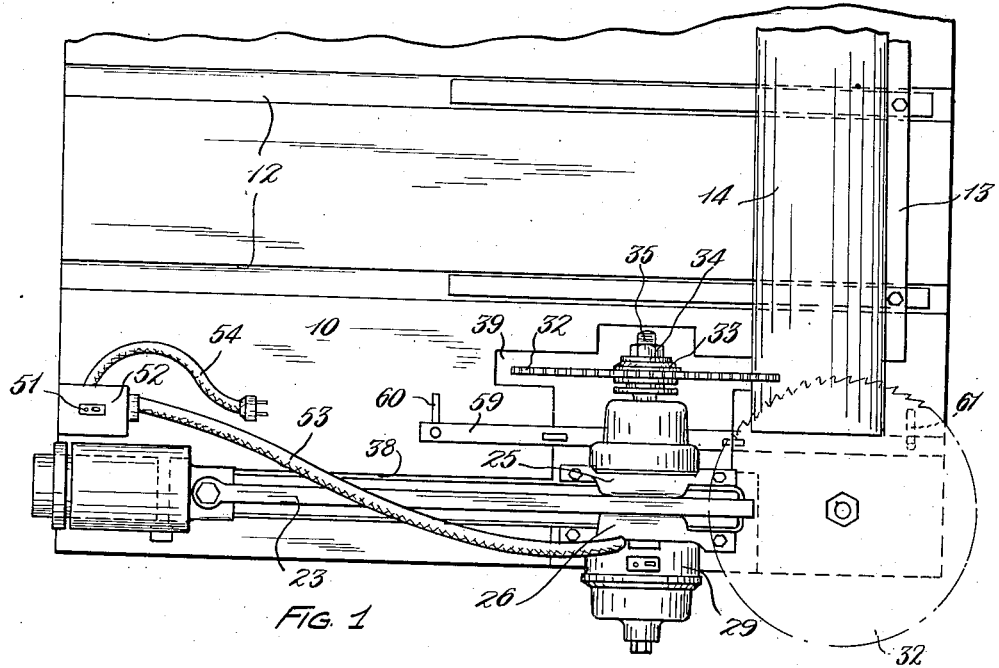
Figure 2:
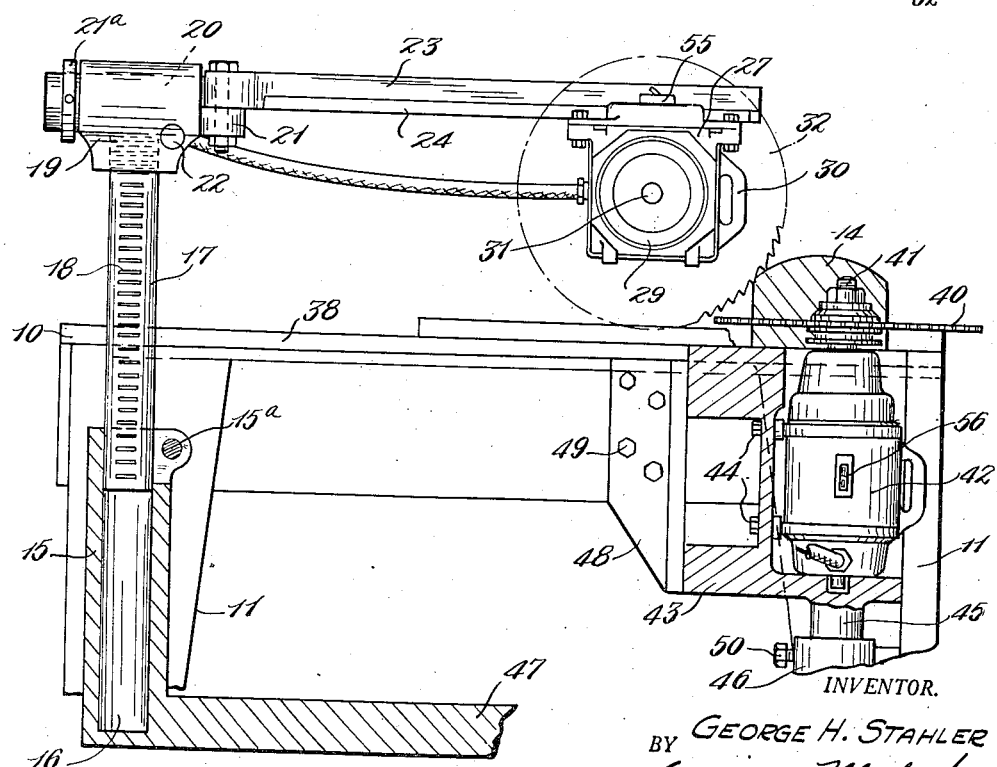

With respect to the accompanying drawings and particularly Figures 1 and 2 thereof, a preferred form of apparatus constructed in accordance with the present invention includes a work table 10 supported on suitable leg members 11. The surface of the table is formed with spaced transversely extending grooves or slots 12 therethrough, wherein is mounted a slide 13 upon which the material to be sawed, for example, a log 14 is reciprocated across the surface of the table 10. Supported below the surface of the table adjacent one side thereof is a hollow casting 15 defining a cylindrical chamber or guide 16 which is adapted to receive an elongated shaft or post 17, having spaced circumferential serrations 18 therealong. The upper end of the casting 15 is formed with a clamping collar actuated by a bolt 15a and engageable with the post 17 for maintaining the post in any desired adjusted position within the chamber 16.

Threaded on the upper end of the post 17 is a T-shaped cap 19 having a transverse cylindrical bore which rotatably receives a cylindrical block 20, one end of which extends beyond the cap and is cut away to form the lug 21. A clamping collar 21a secured to the opposite end of the block 20 maintains the same within the cap 19. Rotative movement of the block 20 within the cap member 19 is controlled by the adjusting bolt 22 which serves to clamp the block in any desired rotated position.

Bolted to the lug 21 and extending outwardly therefrom across the surface of the table 10 is a tool supporting arm 23 having flanges on each side thereof forming a track 24. Slidably mounted on the track 24 by means of spaced runners 25 and 26 is a hanger 27 which supports a motor 29. The hanger is adapted to be manually reciprocated along the track 24 by means of the handle 30. The armature shaft 31 of the motor 29 is extended at one side thereof and receives a saw blade 32 which is retained thereon by means of a beveled washer 33 and nut 34. The threaded end 35 of the shaft 31 is double cut as illustrated in Figures 6 and 7 of the drawings, both right and left hand threads 37 being used. Accordingly, if the saw blade is rotated in a clock-wise manner, a left hand threaded nut is employed, and if rotated counter-clockwise a right hand threaded nut is used. This practice prevents the nut 34 from becoming loose from the end of the shaft. As an alternative to the use of the double cut thread 37 on the shaft 35, a construction illustrated in Figure 8 may be employed. Each end of a motor shaft 60 is extended and threaded, one end with right hand threads and the other end with left hand threads. A bracket 61 is mounted on the motor with a pivot pin 62 extending therethrough which may be pivotally secured to the supporting arm of the device in any suitable manner.

An elongated opening or recess 38 through the table top 10 extending from the rear portion thereof immediately above the cylinder 15 toward the front of the table permits the tool supporting arm to be lowered into a position below the surface of the table when the post 17 is lowered into the guide 16, thereby providing the necessary adjustment to permit the periphery of the saw to project vertically to any desired distance above the surface of the table. Communicating with the forward end of the elongated opening 38 is an opening 39 through the table top so configured as to permit the motor 29 and saw blade 32 to pass to a position below the table as is illustrated in Figure 3.

Through the foregoing arrangement the saw blade may be adjusted in any desired position to operate in accordance with the wishes of the particular operator or in accordance with the operation being performed upon the machine. For example, for some types of sawing it is desirable to have the work maintained in a fixed position on the surface of the table and the saw blade supported wholly above the surface of the table and moved across the work. On the other hand, for rip sawing, it is advisable to have the saw blade disposed in a fixed position, preferably projecting upwardly through the table top as illustrated in Figure 3. The wide range of adjustability in the positioning of the saw blade with respect to the work supporting surface adapts the device of the present invention for practically all types of sawing work.

When it is desired to perform notching or shiplapping in a single operation upon this device, a second saw blade 40 is mounted in the supporting table in such a position that its cutting edge is operatively positioned with respect to the saw blade 32. With reference to the drawings, the saw blade 40 is mounted on the vertically extending shaft 41 of the motor 42, which is supported in the table adjacent the outer extremity of the opening 38. The motor 42 is so arranged as to be adjustable in a vertical plane being mounted in a bracket 43 by means of stud bolts 44 extending through horizontally extending slots which permit limited longitudinal adjustment of the motor within the bracket to compensate for wear on the saw blade. The bracket 43 is provided with a downwardly projecting shaft 45 slidably mounted within a cylinder 46 positioned below the table 10 and supported by cross member 47 extending between the cylindrical casting 15 and cylinder 46. An angular guide 48 is secured to the apron of the table 10 by means of bolts 49 and serves to guide the rising and lowering of the bracket 43. An adjusting bolt 50 extending through the cylinder 46 and engageable with the shaft 45, serves to secure the bracket 43 in any adjusted position within the guide members 48. A guide 59 for the end of the log 14 is adjustable in slots 60 and 61 in the table top to define the depth of horizontal and vertical cut.

A switch 51 mounted on the switch box 52 controls the flow of current to the motors 29 and 42 through the electrical conduit 53 when the cable 54 is connected to a source of electric current. Reversing switches 55 and 56 mounted on the motors 29 and 42 respectively are used only when it is necessary to reverse the cutting operation of the saw blades.

In the operation of the two saws in making horizontal and vertical cuts upon a log as shown in Figure 5, the simultaneous action of the two saw blades effects the complete cut 57 to be made in one operation, similarly the under cut 58 as shown in Figure 5 is made in the same manner except the saw blade 32 is lowered into a position beneath the table as illustrated in Figure 3. The vertical cutting saw is arranged so that it revolves toward the rear of the table when cutting from the top downwardly. This practice is preferable for if it were revolving toward the front, the saw blade would have a tendency to grab and pull the wood toward the blade with the result that the saw blade may be broken and the operator injured. Similarly, the horizontal cutting saw should be revolved in a direction opposite to the direction of movement of the work past the saw blade.

With reference to Figure 4 there is illustrated the device of Figure 1 converted for use as a lathe for turning purposes. In this connection a tail stock 63 is removably secured to the surface of the table 10 by suitable fastening means 64 extending through the top of the table. The tool supporting arm 23 is lowered until the center of the shaft 31 is aligned with the center point 65 of the tail stock and the saw blade 32 (Figure 1) is replaced with any suitable type of chuck 66. To complete the device for turning work, a tool support broadly indicated by the numeral 67 is secured to the surface of the table 10 in the usual manner.

In Figures 9 to 12 inclusive of the drawings there is illustrated a modified form of tool carriage and supporting arm therefor which may be substituted for that shown in Figure 1. With reference to these figures the numeral 68 indicates generally the modified type of tool carriage supporting arm comprising spaced longitudinal members 69 and 70 the opposed edge portions of which are tapered, and transverse end members 71 and 72. The arm is adapted to be secured to the lug 21 by a bolt 72ª. Mounted for movement along the members 69 and 70 of the arm 68 is a tool carriage consisting of a lower member 73 and an upper member 74 which are secured together by means of stud bolts 75. Inclined surfaces formed on each of these members, when assembled, cooperate to receive the tapered surfaces formed on the inner edge portions of the members 69 and 70 of the arm. The member 73 is provided with an enlargement 76 which receives a suitable spindle 77, one end of which is adapted to receive a wood working tool, for example, the saw blade 78 shown in Figures 9 to 11 inclusive and the other end has mounted thereon a suitable pulley wheel 79. The top member 74 is formed with an upstanding cylindrical boss 80 having a bore 81 extended therethrough. The boss 80 is received between ears 82 formed on a bracket plate 83 and the pin 84 extending through the ears 82 and boss 80 serves to pivotally secure the plate 83 to the upper carriage member 74. Mounted upon the plate 83 is a motor 85, the shaft of which is provided with a pulley wheel 86, which in turn is operatively connected to the pulley wheel 79 on the spindle shaft 77 by means of a belt 87. Tensioning of the belt 87 is effected by the adjusting screw 90 extending between the plate 83 and the lower tool carriage member 73.

With particular reference to Figure 12, the tool supporting arm has been rotated through 90° and when so positioned the device may be converted to be used for drilling purposes, in this instance the saw blade 78 on the end of the spindle shaft is replaced with a chuck 88 and drill 89.

Having thus described my invention what I desire to obtain by Letters Patent is defined in the appended claims.

I claim:

1. In a sawing machine, the combination of a work supporting table having a transverse recess formed therein and a guide supported by the table at one end of the recess, an upright post vertically adjustable in said guide, a supporting arm secured to the post, traversing said table and having a motor driven circular saw reciprocably mounted thereon, said arm being adjustable with said post through said recess to move the saw in a vertical plane to operatively position the same above or below the surface of the table whereby the saw may be used to cut the work either from above or below the surface of the table.

2. In a device of the class described, a work supporting table having a transverse opening extending through the top thereof, a guide positioned adjacent one end of said opening, a post vertically adjustable in said guide, means for supporting an arm for rotative movement about its longitudinal axis from the upper end of said post, a carriage slidably mounted on said arm, a motor driven spindle carried by said carriage, said arm being adjustable with said post in a vertical plane through said opening to operatively position the spindle above or below the surface of the table whereby the tool mounted on said spindle may be operable upon the work either from above or below the surface of the table.

GEORGE H. STAHLER.